UNITED STATES PATENT OFFICE.

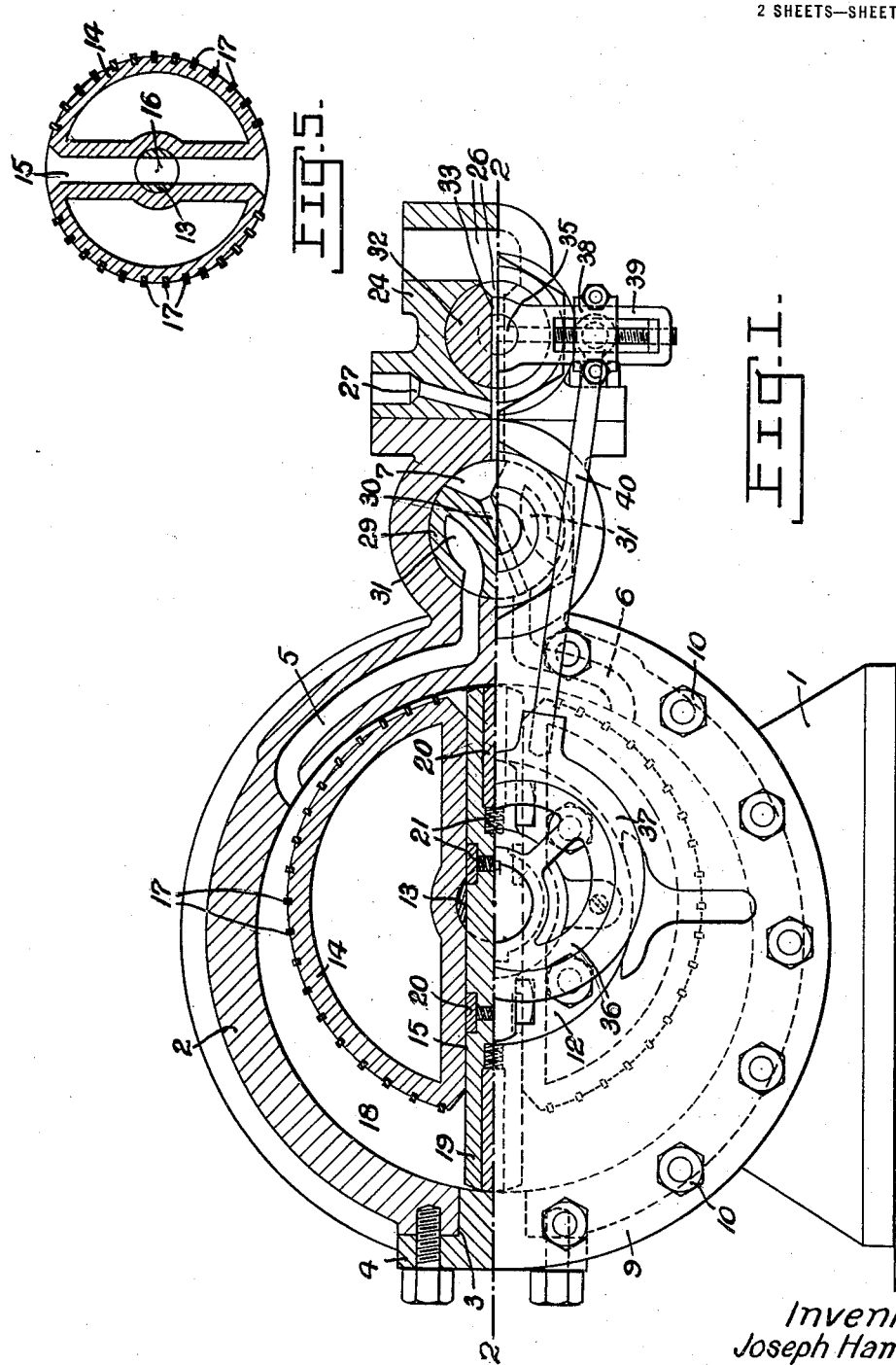

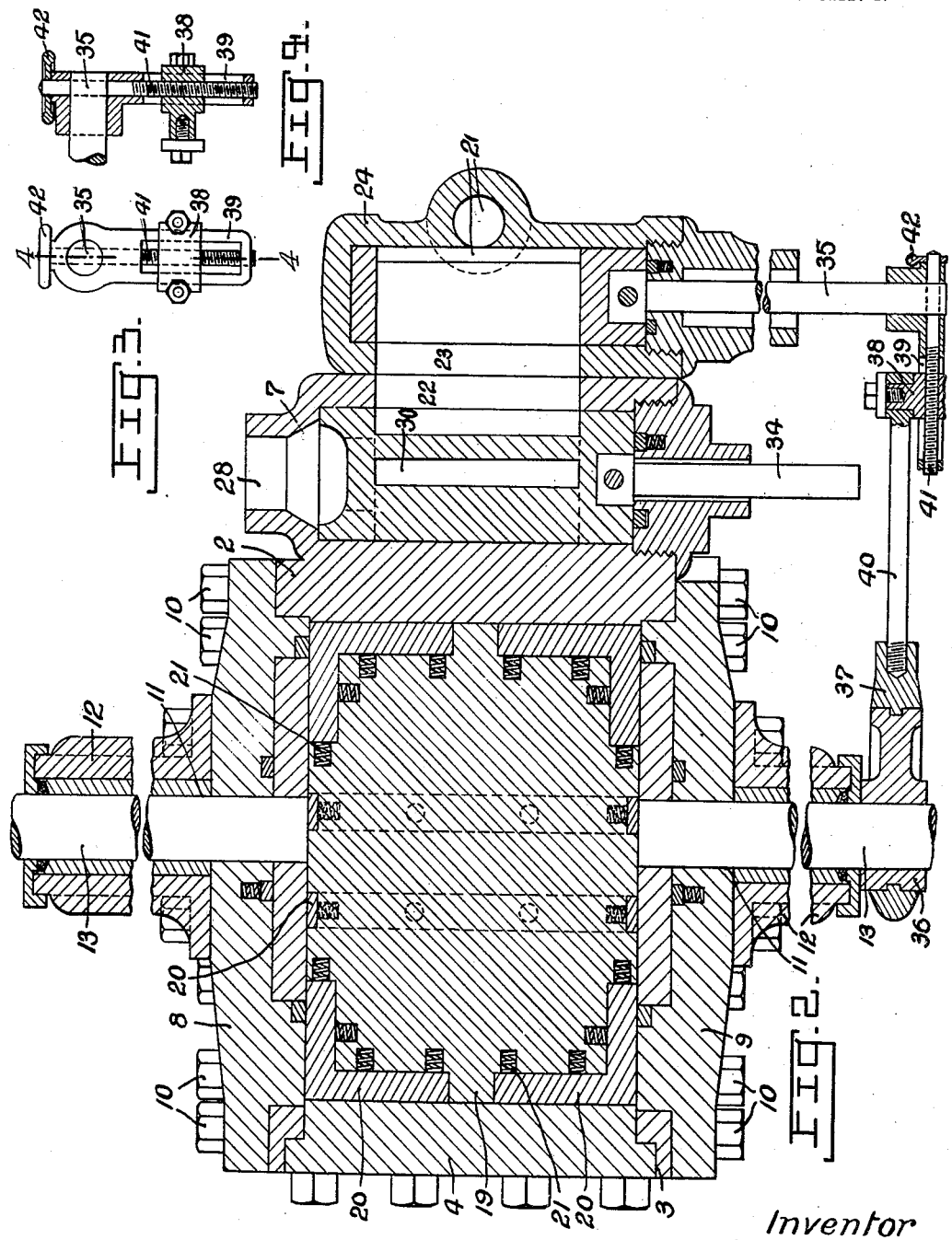

JOSEPH HAMELIN, OF BIENVILLE, QUEBEC, CANADA.

ROTARY STEAM-ENGINE.

1,321,369. Specification of Letters Patent. Patented Nov. 11, 1919.

Application filed April 11, 1919. Serial No. 289,374.

*To all whom it may concern:*

Be it known that I, JOSEPH HAMELIN, a British subject, residing at Bienville, county of Levis, in the Province of Quebec, in the Dominion of Canada, have invented certain new and useful Improvements in Rotary Steam-Engines; and I do hereby declare that the following is a full, clear, and exact description of the same.

The present invention relates to improvements in rotary steam engines and the main object is to provide an apparatus of this character in which the steam supply will be automatically regulated or cut off.

Another object is to provide a turbine of simple design and particularly cheap of construction.

A further object of the invention is to provide a steam chamber having arranged in it an eccentrically disposed drum to allow for steam expansion, said drum being provided with a central rotating paddle which is slidably mounted in said drum.

The invention will be understood with the aid of the accompanying drawings in which:

Figure 1 is a side elevation of the turbine, the upper half portion being shown in a longitudinal section.

Fig. 2 is a cross section view on line 2—2 of Fig. 1.

Fig. 3 is a front elevation of the steam supply valve controlling device.

Fig. 4 is a longitudinal section on line 4—4 of Fig. 3.

Fig. 5 is a cross section through the eccentrically mounted drum.

Like numerals of reference indicate corresponding parts.

In the drawings 1 indicates the base and 2 is a circular casing having at one side thereof an opening 3 closed by a plug 4. 5 and 6 are outlet and inlet steam passages provided in the sides of said casing, said passages communicating at one end with the interior of said casing 2 and at their other end with a circular valve casing 7 which is preferably integral with said casing 2. At each open end of said casing 2 are cover plates 8 and 9 which are suitably secured thereto, by means of the bolt 10. Each of said cover plates 8 and 9 is provided with corresponding eccentrically disposed openings 11 and journal bearings 12 in which is rotatably mounted the cross shaft 13. Rigidly secured on said cross shaft 13 is a drum 14 which is preferably of the same width as said casing 2 and is provided with a central slot 15 which extends therethrough and is adapted to register with the slot 16 in the shaft 13. The said drum 14 may be provided with a plurality of longitudinal packing strips 17 which are utilized to form a stanch friction joint between said drum and the adjacent portion of said casing 2.

The drum 14 being eccentrically mounted in relation to the casing 2 forms a steam expanding chamber 18 which is adapted to communicate on each side of said drum with the outlet and inlet passages 5 and 6.

Movably mounted within said slots 15 and 16 in the drum and cross shaft is a rectangular blade 19 which is provided with curved ends adapted to be in continuous contact with the inner circumference of said casing 2, said blade being provided with a plurality of friction members 20 mounted in suitable recesses and so arranged as to contact with the sides of the casing or the inner sides of the slots 15 and 16 by means of the spiral springs 21 which are inclosed in suitable recesses.

The valve casing 7 is provided with a passage 22 which is in register with the passage 23 provided in the valve casing 24 which is suitably secured to the casing 7 and is provided with the steam inlet 26 to which is preferably connected the steam supply pipe. Intermediate of said valve casings 7 and 24 is a passage 27 adapted to communicate with the passage 22 and which may be used as an independent steam inlet when suitably connected to the steam supply pipe. The steam supplied through this independent inlet may be additional to that supplied through the main inlet 26, or it may be utilized in place of that supplied through said main inlet, according as preferred. In the latter instance, the cut-off valve 32 will have no effect upon the operation of the engine and may, if desired, be thrown out of action by uncoupling its driving connections. The valve casing 7 is also provided with an exhaust opening 28, and 29 is a circular valve member rotatably mounted in said casing 7 and provided with a diametric passage 30, of a funnel shape at one end thereof which is adapted to register with the passage 22 and one of the passages 5 or 6 at the other end 31 are exhaust passages provided on each side of said central passage 30 and which are adapted to communicate with one of the passages 5 or 6 and the exhaust port or opening 28.

In the valve casing 24 is rotatably mounted a valve member 32 having a central passage 33 which is adapted to register with the passage 23 and steam inlet 26. The valve members 29 and 32 are preferably provided with outwardly projecting stems 34 and 35, the stem 34 being preferably manually operated by any suitable means, while the stem 35 is automatically operated by an eccentric 36 which is rigidly secured on one end of the shaft 13 and on which is slidably mounted an eccentric strap 37 which is operatively connected to the adjustable member 38 slidably mounted on the frame or arm 39, by the connecting rod 40. The frame 39 is rigidly mounted on the stem 35, and 41 is a threaded pin having a cross head or handle 42 adapted to adjust the slidable member 38.

In the operation of the invention, the steam enters through the inlet 26, and passes through the passage 33 in the valve 32, and thence through the passages 23 and 22, the latter of which communicates with the funnel shape passage 30 which leads into one of the passages 5 or 6. Steam enters the chamber 18 in the chamber 2, which is so devised as to provide for the proper expansion of the steam, at the same time causing the rectangular blade 19 slidably mounted in the drum 14 to revolve until it passes by the exhaust passage provided in said casing 2.

In the drawings the exhaust passage 5 registers with the exhaust port 31 provided in the valve 29, and the exhaust steam passes through the said port 31 and enters the steam outlet 28 provided at one end of said valve casing 7. To reverse the turbine, the stem 34 may be operated.

When the rectangular blade 19 has reached a predetermined point the steam supply through the inlet 26 is automatically cut off by the valve 32 which is operated by the eccentric 36 provided on the shaft 13.

It will readily be understood that the intermittent cutting off of the steam is regulated by screwing or unscrewing the threaded pin 41 which distances or approaches the slidable member 38 on which is pivotally secured the arm 40 connected to the eccentric strap.

What I claim as my invention is:

1. In a rotary steam engine, the combination of a main casing having a pair of diverging steam passages formed in its circumferential wall and opening at their inner ends into the casing, the outer ends of the passages being disposed close together; a shaft mounted eccentrically on said casing; a drum fixed to said shaft and provided with a sliding blade; a valve casing rigidly connected to the main casing and into which the outer ends of the two steam passages directly open, said casing having a flared exhaust opening at one end; a reversing valve rotatably mounted in the valve casing and formed with a diametric inlet passage having one end adapted to register alternatively with the outlet end of either steam passage and the other end flared, said valve also having a pair of separate exhaust passages adapted to alternatively register at one end with the said steam passages and opening in common through the end of the valve adjacent said flared exhaust opening so as to constantly register therewith; a valve casing at the side of and connected to the reversing valve casing and having a connecting port which opens therethrough and constantly registers with the flared end of the inlet passage in the reversing valve; and a cut-off valve rotatably mounted in the last-named casing and having a diametric passage adapted to be brought into and out of register at one end with the connecting port, the said last-named casing having a steam inlet which is adapted to register with the other end of the diametric passage in the cut-off valve.

2. In a rotary steam engine, the combination of a main casing having a pair of diverging steam passages formed in its circumferential wall and opening at their inner ends into the casing, the outer ends of the passages being disposed close together and opening outwardly through said wall; a rotary piston within the casing; a valve casing rigidly connected to the main casing and into which the outer ends of the two steam passages directly open; a reversing valve rotatably mounted in the valve casing and formed with inlet and exhaust passages for controlling the flow of steam to and from said steam passages; a valve casing at the side of and connected to the reversing valve casing and having a connecting port which leads through the latter valve casing to register with the inlet passage in the reversing valve; and a cut-off valve rotatably mounted in the last-named valve casing and having a passage adapted to be brought into and out of register with the inlet end of the connecting port; the casing of the cut-off valve having a main steam inlet at one side of that valve and adapted to communicate with the inlet end of the passage thereon; and also having an independent steam inlet at the opposite side of the cut-off valve which opens into said connecting port.

Signed at Montreal, Quebec, Canada, this 17th day of March, 1919.

JOSEPH HAMELIN.

Witnesses:
   C. PATENCUIDE,
   B. WOOD.

Copies of this patent may be obtained for five cents each, by addressing the "Commissioner of Patents, Washington, D. C."